United States Patent [19]

Iyeta et al.

[11] 4,196,379

[45] Apr. 1, 1980

[54] PICKUP ARM CONTROL SYSTEM IN RECORD PLAYER OR THE LIKE

[75] Inventors: Motoi Iyeta, Hamakita; Mitsuru Baba, Hamamatsu, both of Japan

[73] Assignee: Nippon Gakki Seizo Kabushiki Kaisha, Hamamatsu, Japan

[21] Appl. No.: 797,346

[22] Filed: May 16, 1977

[30] Foreign Application Priority Data

May 18, 1976 [JP] Japan .................................. 51-56840

[51] Int. Cl.² ............................................ G05B 19/28
[52] U.S. Cl. ................................. 318/601; 274/15 R; 179/100.4 D
[58] Field of Search .................... 318/567, 569, 601; 274/9 R, 10 R, 15 R; 179/100.4 A, 100.4 D, 100.4 ST

[56] References Cited

U.S. PATENT DOCUMENTS

| 3,937,903 | 2/1976 | Osann, Jr. ........................ 274/9 R |
| 3,993,315 | 11/1976 | Hansen et al. ................... 274/9 R |

*Primary Examiner*—Gene Z. Rubinson
*Assistant Examiner*—Eugene S. Indyk
*Attorney, Agent, or Firm*—Cushman, Darby & Cushman

[57] ABSTRACT

In an automatic record disk player, various information as the disk size, the position of the pickup arm, and various operation commands, is supplied as digital signals to a logic circuit, in which logical operations are carried out to control the pickup arm according to a select operation sequence. Manual operation is compatible with the automatic operation, and interruption or discontinuation of play can be achieved at any moment.

6 Claims, 5 Drawing Figures

| STATE | ARM DRIVE | LIFTER |
|---|---|---|
| S0 (0 0 0) | STOP | DOWN |
| S1 (0 0 1) | STOP | UP |
| S2 (0 1 0) | | |
| S3 (0 1 1) | LEFT | UP |
| S4 (1 0 0) | STOP | DOWN |
| S5 (1 0 1) | STOP | UP |
| S6 (1 1 0) | | |
| S7 (1 1 1) | RIGHT | UP |

…

PICKUP ARM CONTROL SYSTEM IN RECORD PLAYER OR THE LIKE

BACKGROUND OF THE INVENTION (a) Field of the Invention

The present invention relates to a control system for controlling the movement of a pickup arm of a record player for an audio disk or a video disk, and more particularly it pertains to a control system for controlling the movement of a pickup arm of a record player during the reproduction of the information signals stored in a rotating disk, by the use of a logic circuit.

(b) Background of the Invention

Controlling of a pickup arm in a record player has been performed in various ways. However, the conventional such controlling systems invariably have certain limitations in the accuracy and the stability of the controlling operations. Particularly, since the conventional control system employs analog circuits in its essential part, it is naturally accompanied by the generally known drawbacks of the analog circuit; the accuracy and reliability of such known system cannot be desirably high, and external noises give an adverse influence to the circuit operation. Furthermore, when a full automatic control system is formed with analog circuits, the number of controlling signals, and hence the number of component parts, becomes inconveniently large, and laborious adjustments of the constituent circuits are required for attaining a high accuracy control. Furthermore a large scale integration of these analog circuits is difficult in view of the required accuracy for these circuits. Then, the total size of the controlling circuits will become large and the manufacturing cost will also become high. Yet, such controlling circuits cannot attain an operation with a desirably high accuracy and stability. Introduction of a logic operation for controlling the full sequence of operations in pickup arm control has not been proposed in the past. The transformation of information into binary signals and the use of a logic operation on such binary signals promise a higher stability and accuracy of the required controlling operation, and also enable a large scale integration of an essential part of a controlling system.

SUMMARY OF THE INVENTION

An object of the present invention, therefore, is to provide a logic system for controlling a pickup arm in a record player, which controlling system being capable of controlling a pickup arm by means of a logic operation based on various information signals.

Another object of the present invention is to provide a logic system for controlling a pickup arm in a record player, which controlling system being capable of performing fully automatic controlling of a pickup arm by the output of a logic circuit and also capable of allowing a manual operation.

Still another object of the invention is to provide a logic system for controlling a pickup arm in a record player which is suitable for integration in a large scale integrated circuit (LSI).

According to the present invention, the condition of various parts in a record player are detected in the input circuit to be produced as information signals, and these signals are supplied to a memory device in a logic circuit to change the state of memory content thereof. The logic circuit determines the next operation from the temporary state in the memory device as well as the freshly-coming information signal through logic operations. For example, the logic operation may be performed on the information of the detected disk size, the detected pickup arm position, the initiation command, the interruption command, and the repeat command. The logic operation outputs are arranged to follow a selected operation sequence to successively control the pickup arm. Therefore, the system is protected from external perturbation and from the erroneous operations, and keeps the record disk from being damaged.

These and other objects, features and the advantages of the present invention will become apparent from the following detailed description when taken in conjunction with the accompanying drawings.

DESCRIPTION OF THE PREFERRED EMBODIMENTS

The present invention is adapted particularly for the controlling of a linear-tracking type tone or video pickup arm, and the following description will be made on the instance of a linear tracking pickup arm. However, the controlling of a pivotal pickup arm can be achieved in an almost similar manner.

Figure 1:
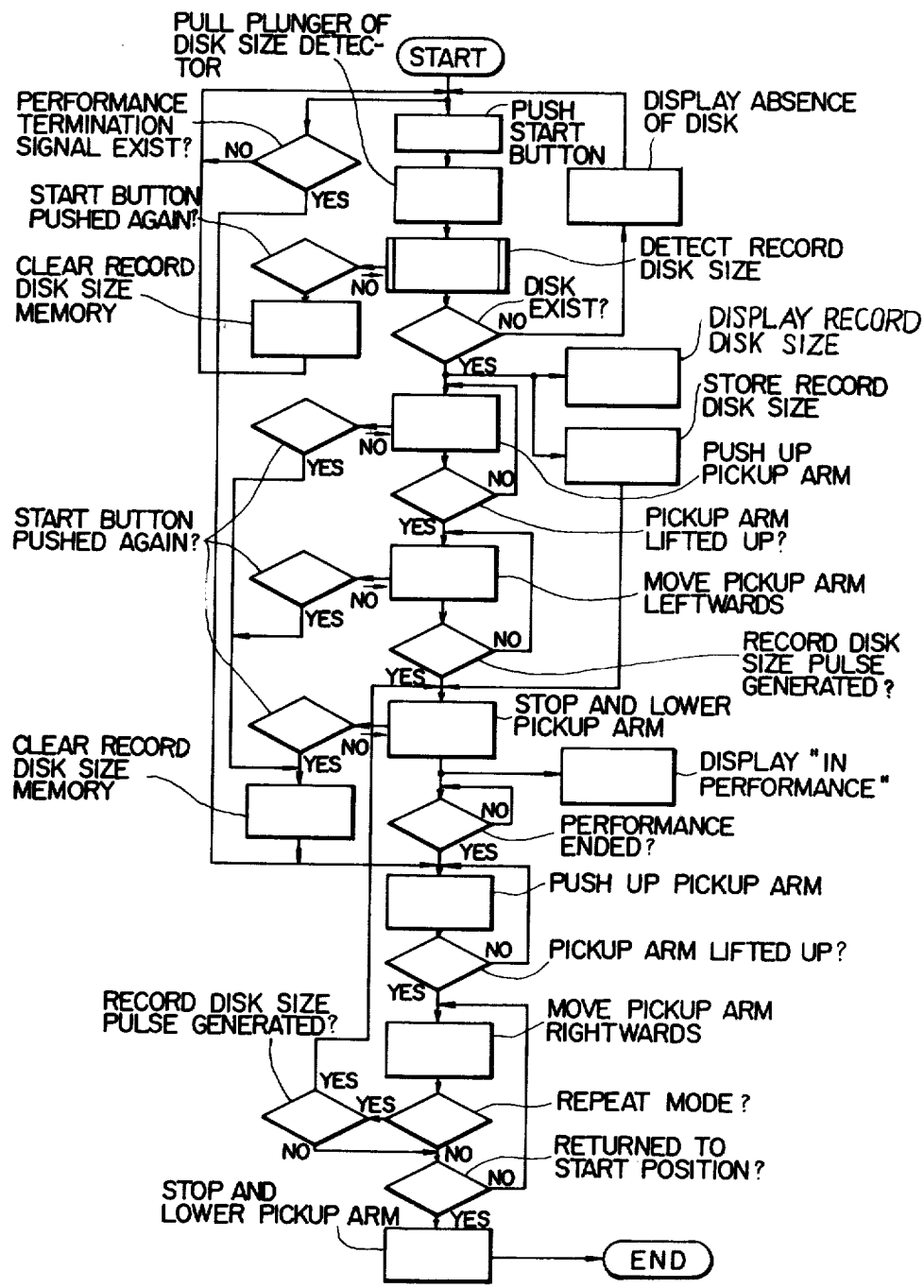
FIG. 1 is a flow chart showing the operation sequence of a pickup arm control system according to an embodiment of the present invention.

FIG. 1 shows the sequences of pickup arm control according to an embodiment of the present invention.

The main flow line of the pickup arm controlling system will be described first. When a record disk is placed on a turntable, and a start button is pushed, a disk size detector is actuated to detect the size of the record disk. Then, a pickup arm is lifted off a pickup arm rest. When the pickup arm is lifted above a threshold height, the pickup arm is moved horizontally toward the center of the disk, i.e. leftwardly, if the pickup arm rest is located at the right side of the turntable. The movement of this pickup arm is monitored at selected points corresponding to the standard sizes of the disks. When the pickup arm is brought to a predetermined position corresponding to the performance-initiating position, the horizontal movement of the pickup arm is stopped, and the pickup arm is gently lowered onto the disk. The performance begins in this state. When the performance is terminated, and when the pickup arm is moved to a predetermined position, i.e. the final groove, the pickup arm is uplifted. After the pickup arm is lifted above the threshold height, it is moved horizontally outwardly (rightwardly). When the pickup arm is returned to the starting position, the horizontal movement is stopped, and the pickup arm is lowered onto the pickup arm rest. When a repeat button is pushed, the pickup arm is returned only to the performance-initiating position, and the performance is repeated again.

When the start button is pushed after the initiation of the operation, the pickup arm is uplifted and is returned to the initial position. Furthermore, when the start button is pushed by mistake without a record disk placed on the turntable, the pickup arm is uplifted and moved leftwardly, but it returns to the initial position since no disk size signal is detected in such an occasion.

Figure 2:
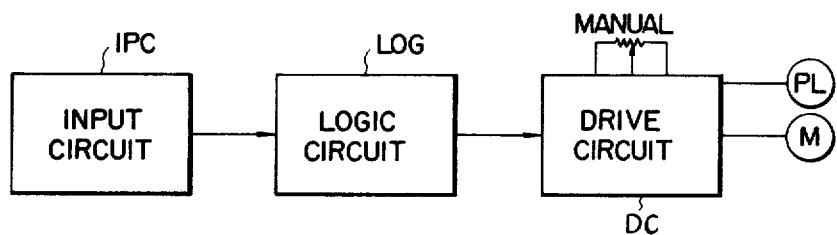
FIG. 2 is a block diagram of a pickup arm control system for carrying out the operation sequence of FIG. 1.
Figure 5:
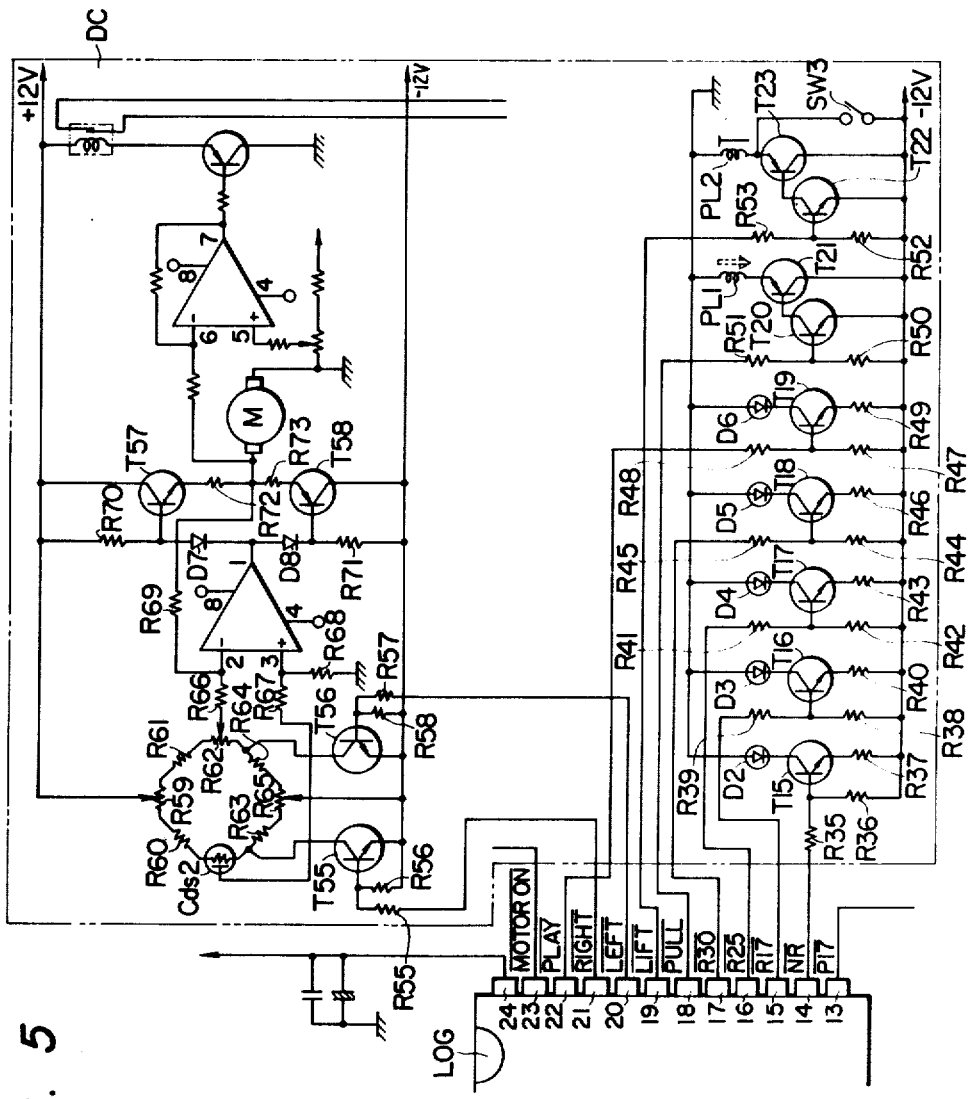
FIG. 5 is a circuit diagram showing an example of a driver circuit to be used in the circuit of FIG. 2.

The system for performing the operation sequence of FIG. 1 is shown in FIG. 2. This system comprises an input circuit IPC including various detectors for detecting the size of a record disk and monitoring the movement of a pickup arm, a logic circuit LOG for performing logical operations on the basis of various detection signals to determine the next operation of the pickup arm, and a driver circuit DC for driving a pickup arm lifting plunger PL2 and a disk size detector driving plunger PL1 as well as pickup arm controlling motor M. A concrete embodiment of each of the logic circuit LOG and the driver circuit DC is shown in FIGS. 3 and 5, respectively.

Figure 3:
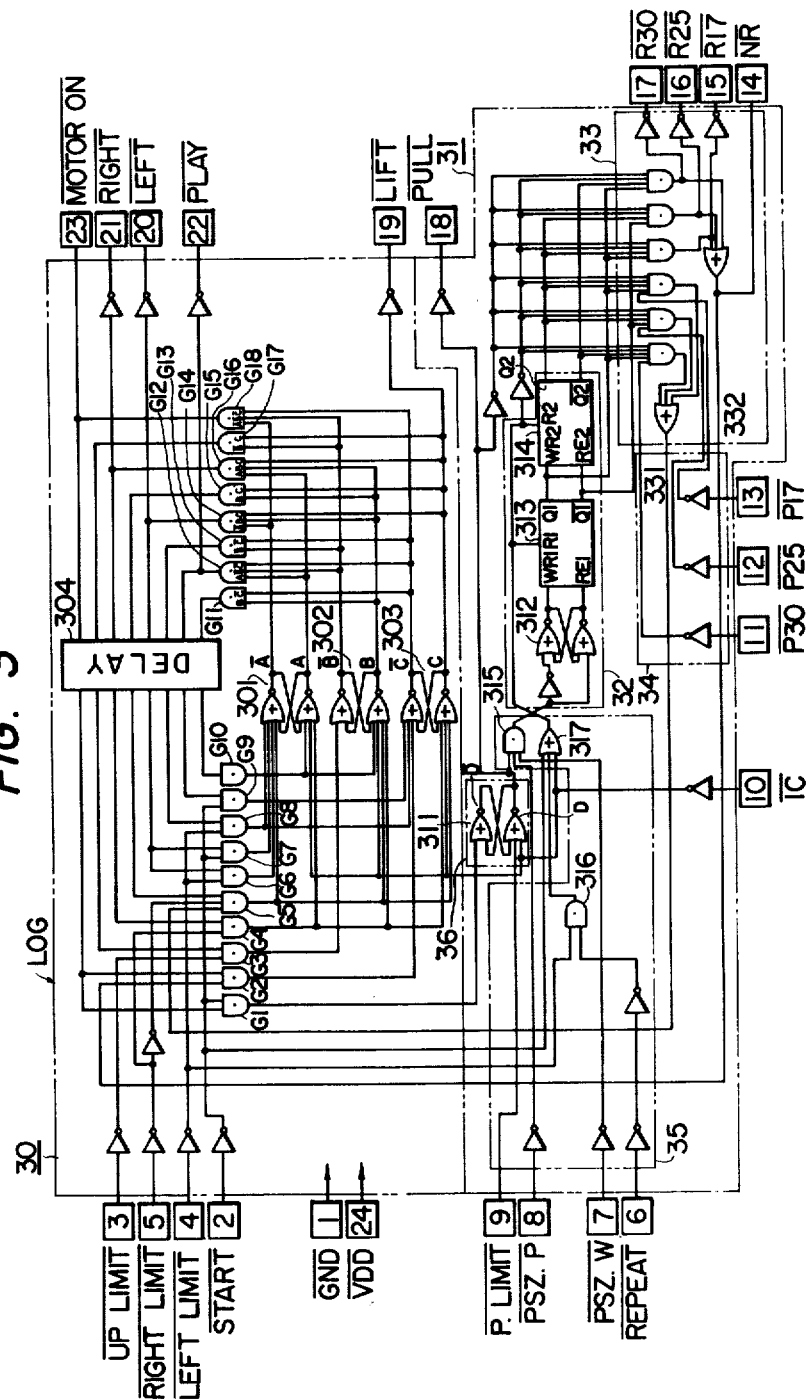
FIG. 3 is a circuit diagram showing an example of a logic circuit to be used in the circuit of FIG. 2.

In FIG. 3, the logic circuit LOG comprises a pickup arm control circuit 30 and a record disk size detecting circuit 31. The disk size detecting circuit 31 further comprises a record disk size memory 32, a record disk size output circuit 33, a pickup arm position detecting circuit 34, a gate circuit 35 and a plunger control circuit 36. The whole logic circuit LOG is integrated on one chip of an LSI of which a voltage source terminal and a grounded terminal are represented by reference numerals 24 and 1, respectively. The pickup arm control circuit 30 includes memory elements 301 to 303 and gates G1 to G18 for performing the logic operations based on the detection signals. The gates G11 to G18 are connected with the gates G1 to G10 through a delay circuit 304. Changes in the outputs of the memory elements 301 to 303 are summarized in FIG. 4.

Referring now to FIG. 3, when the power is supplied into the system, a pulse formed by a leading edge of the power source voltage is supplied to an initial clear terminal 10 of the gate circuit 35 as the initial clear signal IC. This initial clear signal IC re-sets all the memories 301 to 303, 311, 313 and 314.

Figure 4:
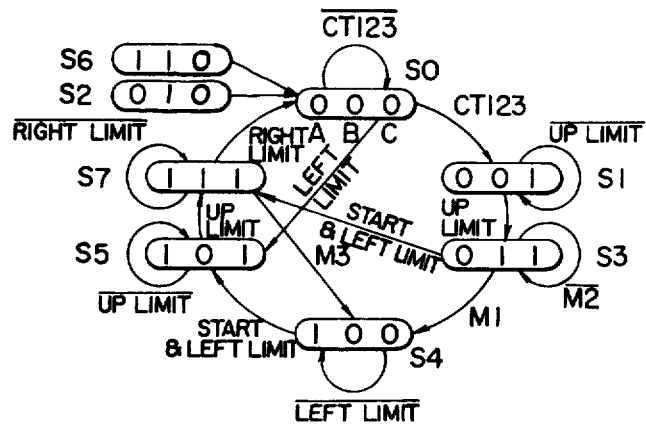
FIG. 4 is a diagram showing the sequence of the memory state in the memory of the logic circuit of FIG. 3.

In this state, the output terminals A, B and C of the memory elements 301 to 303 are all in "0" state (represented as (0, 0, 0) hereinbelow). This state will be referred to as the S0 state as shown in FIG. 4. When a start button of the record player is pushed in this S0 state, a start command pulse is supplied from the input circuit IPC to a start terminal 2. This start command pulse re-sets the memory elements 313 and 314 again and sets the memory element 311 through the gate G1. Here, the other input of the gate G1 has been "1" since the gate G18 which takes the logical product of $\overline{A}$, $\overline{B}$ and $\overline{C}$ has been set ($\overline{A} \cdot \overline{B} \cdot \overline{C}$="1") by the initial clear. When the memory element 311 is set, the output terminal D thereof takes "1" level. This output is supplied through an output terminal 18 of the logic circuit LOG to the base of a transistor T20 (FIG. 5) to turn on the transistor T20 and thereby another transistor T21 which excites the plunger PL1 for driving the disk size detector (not shown). On the other hand, the D output of the memory 311 opens a disk size read gate 315. The disk size detector which is driven by the plunger PL1 generates two kinds of pulse signals; one is generated, for instance, by using a light beam emitted from a detector-coupled light source and reflected from the disk surface so that the pulse has a width proportional to the size of the record disk, and the other is generated each time the detector passes positions on the turntable corresponding to the standard sizes of the disks irrespective of the presence of the disk on the turntable. The use of these two kinds of signals raises the reliability of the size detection. These pulse signals $\overline{PSZ.W}$ and $\overline{PSZ.P}$ are supplied to input terminals 7 and 8 of the logic circuit LOG. The AND gate 315 takes the logical product of the D output of the memory circuit 311 and these pulse signals, and it supplies pulse signals corresponding to the disk size to the memory elements 313 and 314 of the disk size memory 32 to store the disk size information therein. The memory content of the disk size memory 32 is supplied to the disk size output circuit 33 and is sent as a signal CT123 to the gate G2 of the pickup arm control circuit 30 through an output line 332. Since the outputs A, B and C of the memory elements 301 to 303 are in the state of S0 (0, 0, 0), the gate G18 taking the logical product $\overline{A} \cdot \overline{B} \cdot \overline{C}$ supplies "1" to the gate G2. The gate G2 supplies "1" to the memory element 303 to set it in response to said size detection signal. Thus, the state of the memory elements 301 to 303 changes to the state of S1 (0, 0, 1). The C output "1" of the memory element 303 is supplied through a terminal 19 of the logic circuit LOG to transistors T22 and T23 of the driver circuit (FIG. 5). Then, the plunger PL2 constituting a pickup arm lifter is actuated to uplift the pickup arm (not shown).

When the pickup arm is raised above a threshold height, an upper limit switch (not shown) is actuated to generate an upper limit pulse which is supplied to an input terminal 3 of the pickup arm control circuit 30. Here, the upper limit pulse may alternatively be generated after a predetermined time elapses from the commencement of the arm lifter actuation and, therefore, under the control of a time constant circuit. Since the gate G17 taking the logic product of $\overline{B}$ and C has been supplying "1" to the gate G3, the gate G3 supplies "1" upon reception of the upper limit pulse to set the memory element 302. Thus, the state of the outputs A, B and C of the memory elements 301 to 303 changes to (0, 1, 1) (S3 state of FIG. 4). Then, the gates G14 and G15 respectively taking the logic products of $\overline{A}$, B and C, and B and C generate outputs of "1" level. The "1" output of the gate G14 is supplied through a terminal 20 to the base of a transistor T56 of the driver circuit (FIG. 5) to move the pickup arm horizontally leftwardly, i.e. toward the center of the record. Here, since the C output of the memory element 303 has been "1," the pickup arm is kept to be lifted up.

A pickup arm position detector (not shown) is provided in the pickup arm structure to monitor the position of the pickup arm. This detector may comprise an actuating magnet coupled to the pickup arm, and magneto-sensitive elements disposed at positions corresponding to the standard sizes of record disks. Pickup arm position signals are supplied to terminals 11 to 13. Namely, when the pickup arm is above the initial groove of a disk of 30 cm, 25 cm, or 17 cm in diameter, a corresponding signal is supplied to the terminals 11, 12 or 13, respectively. On the other hand, the size of the record disk placed on the turntable is detected and stored in the disk size memory 32. When the memory content of the disk size memory coincides with the signal supplied from one of the input terminals 11, 12 and 13, there is generated a "1" level signal M1 on an output line 331 of the disk size output 33. This "1" level signal is supplied to the gate G5. Since the memories 301 to 303 have been in the S3 state, the gate G15 has been supplying "1" to the gate G5. Thus, the gate G5 supplies "1" signal M2, which sets the memory element 301 and re-sets the memory elements 302 and 303. Thus, the state of the memory outputs A, B and C changes to (1, 0, 0) (S4 in FIG. 4). Then, the gates G12 and G13 supply "1" level. The output of the gate G12 is supplied through a terminal 22 to a "play" indicator (not shown) to display that the pickup arm is in performance. The output of the gate G14 which is supplied to the terminal 20 changes from "1" to "0" to stop the horizontal movement of the pickup arm. At the same time therewith, the C output of the memory 303 which is supplied to the terminal 19 also changes from "1" to "0" so as to turn the transistors T22 and T23 off, and thereby to lower the position of the pickup arm gradually. Thus, the performance is initiated.

When the performance on one side of a record disk is terminated, the pickup arm is naturally driven to the final groove position. A final groove position detector (not shown) then supplies a left limit pulse signal to an input terminal 4. Here, if the repeat play switch (not shown) is open, a gate 316 takes the logical product of these signals (the left limit signal and the inverted repeat signal) to re-set the memory elements 313 and 314 of the disk size memory 32 to clear the memory content. Furthermore, the gate G8 generates "1" level which sets the memory elements 301 and 303. Thus, the state of the memory outputs changes to (1, 0, 1) (S5 in FIG. 4). The C output "1" of the memory element 303 is supplied to the terminal 19, which turns the transistors T22 and T23 "on" to excite the plunger PL2 and to actuate the pickup arm lifter. Thus, the pickup arm is uplifted, and an upper limit signal is supplied to the input terminal 3. Thus, the gate G3 generates "1" output, which sets the memory element 302. The state of the memory elements 301 to 303 is thus shifted to S7 state (1, 1, 1). Then, the outputs of the gates G15 and G16 change to "1." The output of the gate G16 is supplied through a terminal 21 to a transistor T55 of the driver circuit of FIG. 5 to drive the motor M in the reverse direction. Thus, the pickup arm is moved rightwardly (toward the pickup arm rest). On the way of this return, the pickup arm position detecting circuit 34 is actuated to supply position signals to the input terminals 11, 12 and 13 successively. Here, however, if the repeat play switch is open, the memory content of the memory elements 313 and 314 has been already erased, and hence the record size output circuit 33 generates no output at output terminals 14 to 17. Thus, the pickup arm is returned to the pickup arm rest position at which a magneto-sensitive element disposed at a position corresponding to the pickup arm rest position generates an output signal, which is supplied to an input terminal 5. Thereby, the gate G4 generates "1" level signal which re-sets all the memory elements 301 to 303. The memory content of the elements 301 to 303 is returned to (0, 0, 0) (S0 of FIG. 4). The outputs at the terminals 21 and 19 fall to "0" level. Thereby, the horizontal movement of the pickup arm is stopped, and the pickup arm is lowered to rest on the pickup arm rest. The above steps are the usual full automatic play sequence.

When a repeat play of a record disk is desired, the repeat switch has to be closed. The detection of the record disk, the storing of the disk size and the introduction of the pickup arm onto the record disk are all similar to the above-said ordinary steps, and will be described briefly hereinbelow.

When the power is thrown in, all the memory elements 301 to 303, 311, 313 and 314 are cleared. When the start button is pushed, the plunger PL1 for detecting the disk size is excited to drive the disk size detector. The detected disk size is stored in the memory elements 313 and 314 of the disk size memory 32, and the detection signal is sent to the pickup arm control circuit 30 to shift the state of the memory elements 310 to 303 from S0 to S1. Here, the pickup arm lifter is actuated to uplift this arm. The upper limit signal from the pickup arm lifter shifts the memory output state from S1 to S3. Then, the pickup arm is translated leftwardly. On the way of this leftward movement of the pickup arm, the disk size output circuit generates a coincidence signal when the pickup arm is brought to a position corresponding to the detected record size. The memory output state is shifted from S3 to S4 thereby. Here, the leftward movement of the pickup arm is stopped and this arm is gently lowered in its position onto the record disk to begin the performance.

When the stylus is introduced to the final groove, the final groove position detector supplies a play termination signal to the input terminal 4. Here, since the memory output state has been S4 (1, 0, 0), the output of the gate G8 rises to the "1" level which sets the memory element 303 to shift the memory output state from S4 to S5 (1, 0, 1). Here, the play termination signal is also supplied to the gate 316 of the gate circuit 35 through the input terminal 4. Since the repeat switch has been closed in this part of operation, the gate 316 does not change its output, and keeps the "0" level. Thus, the stored record size memory is not erased. (When the repeat switch is open, the gate 316 raises its output to "1" level and erases the record size memory.) As the memory output state is brought into S5 state, the pickup arm lifter is actuated to lift this arm. When the upper limit signal is generated, the memory state changes to S7 state and the pickup arm is translated rightwardly. As the pickup arm is moved, the pickup arm position detecting circuit generates pickup arm position signals. In this part of operation, since the disk size memory 32 is not cleared, the disk size output circuit 33 generates a coincidence signal when the disk size signal and the pickup arm position signal coincide with each other. This occurs at the position of the introduction groove for initiating the performance on the detected record disk, which is the position at which the performance is started initially. The coincidence signal M3 is supplied to the gate G5. Since the memory output state has been S7 (1, 1, 1), the output of the gate G5 changes to "1" level which sets the memory element 301 and re-sets the memory elements 302 and 303. Thus, the output state shifts from S7 to S4. Then, the rightward movement of the pickup arm is stopped and the pickup arm is gently lowered in its position onto the record disk to repeat the performance. As the performance is advanced to a point where a termination signal is generated, the pickup arm is uplifted by the pickup arm lifter and is moved rightwardly. If the repeat mode is continued, the pickup arm stops at the introduction groove position and falls down onto the record disk to repeat the performance again. Thus, in the repeat mode, the memory output state changes first in the order of S0, S1, S3, S4, S5, S7 and then in the cycle of S4, S5, S7. The release of the repeat mode is achieved by pushing the start button again.

Next, interruption of the performance will be described. When the system is in the midst of performance according to the ordinary full automatic play sequence, the memory state is in S4 (1, 0, 0) of FIG. 4. Here, if the start button is pushed to interrupt the performance, only output of the gate G9 changes to "1" level. Then, the memory element 303 is set to shift the output state from S4 to S5. Thus, the pickup arm is uplifted at this position, and then it is moved rightwardly. Furthermore, by the depression of the start button, the memory elements 313 and 314 of the disk size memory 32 are re-set through the gate 317 to clear the disk size memory. Thereby, while the pickup arm is returned to the pickup arm rest position in a manner similar to that of the instance when the stylus has traced up to the final groove, no control signal is generated on the way back, and the pickup arm is stopped above the pickup arm rest position and is lowered thereat. This interruption of the performance is also valid in the repeat mode, and in the leftward movement before the real performance. For example, when the memory output state is S3, the pickup arm is being lifted up and moved leftwardly. When the start button is pushed in this state, the output of the gate G7 changes to "1" level and the memory element 301 is set to change the output state from S3 (0, 1, 1) to S7 (1, 1, 1). Furthermore, the disk size memory is erased upon depression of the start button. Thus, the pickup arm is driven rightwardly to the pickup arm rest position and is lowered thereat.

Next, description will be made on the instance when there is no record disk on the turntable.

When the start button is pushed in the state of S0 (0, 0, 0), a signal is supplied to the terminal 2 to raise the output of the gate G1 to "1" level, and the memory element 311 of the plunger control circuit 36 is set to actuate the disk size detector. Then, the gate 315 in the gate circuit 35 takes the logical product of the width pulse and the number pulse of the disk size to store the disk size in the disk size memory 32. Here, when there is no record disk on the turntable, the pulse signal $\overline{PSZ.W}$ is not generated so that no disk size information can be stored in the memory 32. When the disk size detector is driven to a predetermined final position, a signal is supplied to an input terminal 9 which re-sets the memory element 311 and the disk size detector is returned to the initial position. Here, however, no output is generated from the disk size detector circuit 31. Thus, the output state of the memory elements 301 to 303 of the pickup arm control circuit 30 is held in the state of S0. Therefore, when there is no record disk on the turntable, the pickup arm will never make any movement.

Next, description will be made on the manual operation mode.

The manual operation circuit is shown in FIG. 5, in which a signal is derived from a bridge circuit formed at one input end of the driver circuit DC with resistors R59 to R65 and a photo-resistor CdS2, and it is amplified in an operation amplifier IC1 to drive the pickup arm driving motot M. Transistors T55 and T56 which are connected to parts of the bridge circuit are turned on and off by the control signal supplied from the logic circuit LOG, and control the motor M to drive the pickup arm leftwardly or rightwardly. In the bridge circuit, the resistor R62 is a variable resistor connected to a manual operation lever for changing its resistance, and it can control, when the transistors T55 and T56 are in the off state, the driving speed of the pickup arm continuously and in proportional to the angle by turning the lever leftwardly or rightwardly. The manual operation lever has no relation with the logic in the logic circuit LOG, and it can be manipulated independently of the output state of the logic circuit. However, when either one of the transistors T55 and T56 is being controlled to be turned on by the output of the logic circuit LOG, the manual operation lever gives only small effect and it cannot freely control the pickup arm, since the change in the input voltage level to the amplifier IC1 due to the on-off operation of the transistors T55 and T56 is considerably larger than that due to the resistance change in the variable resistor R62. The resistor CdS2 is provided for detecting small variations of the pickup arm position. The resistors R59 and R65 are variable for taking the balance of the bridge.

Manual operation can be done both in cooperation with and independently from the full automatic sequence. The instance when the performance is initiated by manual operation will be described below.

When a reproduction performance which has been initiated manually is terminated, the memory state is held at S0 (0, 0, 0) of FIG. 4, and a signal is supplied to the terminal 4. Thus, the gate G8 supplies "1" level which sets the memory elements 301 and 303. The memory state shifts from S0 to S5 (1, 0, 1). Then, the pickup arm is uplifted and is moved rightwardly. Namely, when the performance is initiated manually, the automatic control follows the performance, and it performs an automatic return of the pickup arm.

Finally, the reaction to an erroneous operation in this pickup arm control system will be described.

In the full automatic mode, when the disk size memory happens to be erased by some reason or other during the leftward translation after the detection of the disk size and the uplifting of the pickup arm, no coincidence signal is generated from the disk size output circuit 33. Thus, the pickup arm will be carried to the final (or innermost) position at which the left limit signal is supplied to the terminal 4. Here, since the memory state has been S3 (0, 1, 1), the gate G6 supplies "1" level to set the memory element 301 and shift the state from S3 to S7 (1, 1, 1). The pickup arm is returned to the pickup arm rest. Namely, when a record disk is detected to initiate the pickup arm control, but when the memory content is erased or not generated at an appropriate position for any reason, the left limit switch is generated at the innermost position and the pickup arm is returned to the pickup arm rest without falling at any intermediate position.

As shown in FIG. 4, the memory output state S2 (0, 1, 0) and S6 (1, 1, 0) is not used in the above described sequences. Though such state is left unused, there will be some possibility that the system would fall into one of such state and cannot go out of such state. In the above embodiment, the gate G10 is provided to detect such state to shift the memory state back to an operative state of the ordinary loop.

In FIG. 5, symbols D2 to D6 represent light-emitting diodes for display purpose; T15 to T19 represent driving transistors, and SW3 represents a switch for manually controlling the pickup arm lifter plunger PL2. This switch may be interconnected to the manual operation lever so that it may be opened and closed by vertical angular movement of the manual operation lever.

The present invention is adapted particularly for use in a linear tracking pickup arm type disk player, but is not limited thereto, and it can be modified in various ways, especially with respect to the constructions of the detectors for detecting the pickup arm positions and the disk size.

What is claimed is:

1. A pickup arm control system in a record player or the like comprising:

means for selectively driving a pickup arm up, down, to the right and to the left;

an input circuit for detecting the size of a record disk and monitoring the movement of a pickup arm and generating detection signals corresponding thereto, and a logic circuit for performing logical operations on said detection signals, said input circuit including a light detector and a coupled light source for reflecting light off a record disk to said light detector and generating a first pulse representative of the size of the record disk when there exists the record disk on a turntable, and additional detector means for generating a second pulse representative of the size of the record disk corresponding to standard disk sizes, said logic circuit including a disk size memory and an AND gate, said AND gate taking the logical product of said first and second pulses representative of disk size to form a disk size information signal, which is stored in said disk size memory and is supplied to said pickup arm driving means to actuate it, whereby if no disk size information signal is generated there is no actuation of said pickup arm, said input circuit further including a pickup arm position monitoring circuit comprising means for sensing the position of the pickup arm as it moves to the right or the left and for furnishing a signal to drop the pickup arm as it moves to the left when the position of the pickup arm corresponds to the disk size information signal stored in said disk size memory.

2. A pickup arm control system in accordance with claim 1 wherein said pickup arm position monitoring circuit comprises an actuating magnet coupled to the pickup arm and a plurality of cooperating magneto-sensitive elements disposed at positions along a disk turntable corresponding to standard sizes of record disks.

3. A pickup arm control system in accordance with claim 2 wherein said pickup arm position monitoring circuit also includes a final groove position detector which furnishes a signal to raise the pickup arm when it arrives at the final groove position.

4. A pickup arm control system in accordance with claim 3 including a repeat switch which, when actuated, causes said disk size memory to retain the disk size information signal despite arrival of the pickup arm at the final groove position, so that as the pickup arm moves to the right it is dropped when the pickup arm position signal corresponds to the disk size information signal stored in said disk size memory.

5. A method for controlling a pickup arm in a record player or the like comprising the steps of:

detecting the size of a record disk on a turntable and generating a disk size information signal when there is a record disk on the turntable;

storing the disk size information signal in a memory means and generating a corresponding signal;

initiating the movement of the pickup arm only when the disk size information signal is generated, and generating pickup arm position signals as the pickup arm is moved from a rest position toward the center of the turntable;

stopping the movement of the pickup arm toward the turntable center and lowering it to the record disk when there is coincidence between a pickup arm position signal and the disk size information signal stored in the memory, and sensing when the pickup arm is at a final groove position, and raising the pickup arm and moving it toward the rest position.

6. The method of claim 5 including the step of either erasing the disk size information signal if a repeat switch is not closed and continuing to move the pickup arm toward the rest position; or not erasing the disk size information signal if the repeat switch is closed and terminating movement of the pickup arm toward the rest position and lowering the pickup arm when there is coincidence between a pickup arm position signal and the disk size information signal stored in the memory.

* * * * *